United States Patent [19]

Woodruff

[11] Patent Number: 4,511,304

[45] Date of Patent: Apr. 16, 1985

[54] LATCH FOR SECURING REEL CARRYING SPINDLES TO A LOADING AND UNLOADING MECHANISM

[75] Inventor: Roger D. Woodruff, Hebron, Ind.

[73] Assignee: Champion Corporation, Hammond, Ind.

[21] Appl. No.: 415,134

[22] Filed: Sep. 7, 1982

[51] Int. Cl.³ .............................................. B65H 75/40
[52] U.S. Cl. ..................................... 414/546; 414/911; 242/86.5 R; 403/154; 403/317
[58] Field of Search ....................... 414/546, 555, 911; 242/86.5 R, 86.7; 403/154, 316, 317

[56] References Cited

U.S. PATENT DOCUMENTS

| | | | |
|---|---|---|---|
| 2,158,116 | 5/1939 | Graham | 403/316 X |
| 3,367,600 | 2/1968 | Olson | 242/86.7 |
| 3,820,673 | 6/1974 | McVaugh | 414/546 |
| 3,902,612 | 9/1975 | Hall | 414/546 X |
| 3,990,650 | 11/1976 | Devine | 414/911 X |
| 4,091,946 | 5/1978 | Kraeft et al. | 414/911 X |
| 4,102,124 | 7/1978 | Swager | 403/154 X |
| 4,155,518 | 5/1979 | Small | 414/546 X |
| 4,385,862 | 5/1983 | McVaugh | 414/546 X |

FOREIGN PATENT DOCUMENTS 1371264 10/1974 United Kingdom ................ 403/317

Primary Examiner—Leslie J. Paperner
Assistant Examiner—Ken Muncy
Attorney, Agent, or Firm—McDougall, Hersh & Scott

[57] ABSTRACT

A locking mechanism comprising a latch mechanism having a plate-like body defining a completely enclosed aperture dimensioned to receive a spindle and having a manually operable mechanism for releasably attaching the body to the arm to prevent translational movement of the body in a plane perpendicular to the spindle. Other mechanisms restrict axial movement of the spindle and prevent rotation of the spindle.

14 Claims, 4 Drawing Figures

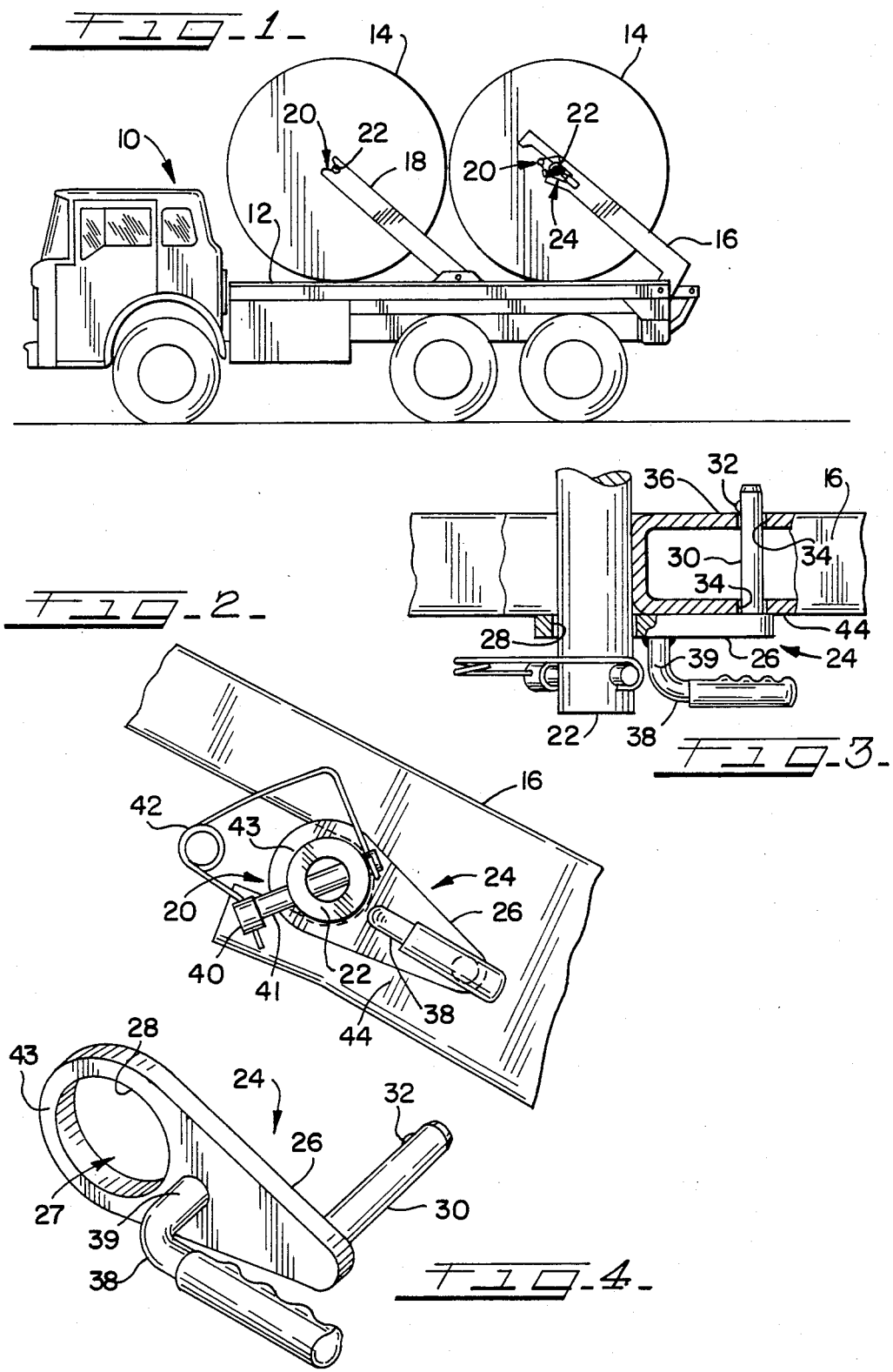

LATCH FOR SECURING REEL CARRYING SPINDLES TO A LOADING AND UNLOADING MECHANISM

BACKGROUND OF THE INVENTION

This invention relates to a latch mechanism for captivating a spindle to pivotally mounted arms which load and unload reels carried by the spindle to and from the bed of a truck. The latch of the present invention is particularly, but not exclusively, suited for use with loading and unloading mechanisms mounted to a truck bed whereby reels of telephone cable or the like can be loaded, unloaded, and held in a position for unwinding cable.

Various types of latches have been used to captivate a spindle to pivotally mounted lift arms. Typically the lift arms have a notch or recess dimensioned to receive the spindle therein. One type of latch commonly used to captivate the spindle within the recess consists of a hook-shaped member pivotally mounted to the arm near the recess. It is rotated from a receiving position which allows the spindle to enter the recess to an operative position to captivate the spindle within the recess of the arm. An example of a latch of this type is disclosed in McVaugh U.S. Pat. No. 3,820,673.

SUMMARY OF THE INVENTION

It is a general object of this invention to provide an improved latch mechanism for captivating a reel carrying spindle within the recesses provided in the pivotally mounted lifting arms of a loading and unloading means.

A more specific object of this invention is to provide a latch mechanism which mounts to a lifting arm and completely surrounds the spindle captivating same to the lifting arm to prevent an inadvertent release of the spindle.

A still further object of this invention is to provide a latch mechanism which prevents spindle rotation while cable is being unwound from the reel.

The invention relates to a mechanism for moving structures relative to a supporting bed. This mechanism includes pivotally mounted arms having recesses defined at one end of the arms, rod means carried by the structures for engagement with the recesses in the arms whereby pivoting movement of the arms operates to lift the structures, and means for locking the rod means in engagement with the recess in each arm.

The improvement in the locking means is characterized by a latch having a plate-like body defining a completely enclosed aperture dimensioned to receive the rod means therethrough. The latch includes a manually operable means for releasably attaching the plate-like body to an arm to prevent translational movement of the body in a plane perpendicular to the rod means. A handle is mounted to the body at a location adjacent the aperture so as to abut a pin carried by the spindle to restrict the rotation of the latter.

BRIEF DESCRIPTION OF THE DRAWINGS

FIG. 1 is a side elevational view of a truck including loading and unloading arms adapted to receive a latching mechanism according to the invention.

FIG. 2 is an enlarged fragmentary view of a lifting arm as shown in FIG. 1 incorporating an embodiment of the latch mechanism of the present invention.

FIG. 3 is a top view of the structure illustrated in FIG. 2 with portions shown cut away for clarity.

FIG. 4 is a perspective view of an embodiment of the latch mechanism of the present invention.

DETAILED DESCRIPTION

FIG. 1 illustrates a truck 10 having a truck bed 12 for carrying reels 14 of cable or the like. Pivotally mounted lift arms 16 are provided for loading and unloading the reels, and transfer arms 18 are provided for receiving a reel from arms 16 and shifting the reel to a forward position on bed 12. Arms 16 and 18 include recesses 20 for engaging a spindle 22 which passes through the core of the reel carried by it during the loading and unloading operations. An improved latching mechanism 24 according the present invention is shown in FIG. 1 mounted to arms 16 to prevent spindle 22 from disengaging recess 20.

Referring in particular to FIGS. 2-4, latch mechanism 24 includes a plate-like body 26 preferably made of a metal and having a completely enclosed aperture 27 defined by bore 28 which is dimensioned to receive spindle 22 therethrough. A rod 30 mounted to body 26 projects perpendicular to the plate-like body and preferably includes a spring loaded ball detent 32 mounted near the remote end of rod 30. A bore 34 defines a hole through arms 16 for receiving rod 30. Bore 34 is positioned on arm 16 to be engaged by rod 30 while bore 28 in body 26 simultaneously engages the spindle disposed in recess 20.

The ball detent 32 functions as a releasable stop which will abut against the inner face 36 of arm 16 to retain the body 26 to the arm. Rod 30 when inserted through bore 34 provides a means for locking the latch to the arm to prevent translational movement of the body 26 in a plane perpendicular to the spindle. A handle 38 is attached to body 26 to permit the latch to be easily engaged with the lifting arm and spindle, and easily removed therefrom. The handle is preferably made of metal and includes a first portion 39 perpendicular to the body 26 and a remote portion generally parallel to the body.

A hole near each end of spindle 22 generally perpendicular to the spindle receives a pin or abutment member 40. The pin at the trailing end of the spindle abuts outer surface of body 26 to restrict the axial movement of the spindle. A wire spring 42 has one end permanently mounted to an end of pin 40 and its other end configured to engage the other end of the pin. The wire spring is used to secure pin 40 to the spindle. The length of pin 40 is selected so that at least one section 28 of the pin extends beyond the spindle to engage portion 39 of handle 38. Thus, the pin and handle function as a means for preventing the rotation of the spindle. Unless restricted, the spindle will rotate due to the rotation of the reel carried thereby as cable is unwound.

The combination of latch 24 which prevents lateral movement of the spindle and pin 40 which prevents axial movement of the spindle is especially effective in controlling the spindle, and hence the reel, during loading and unloading operations.

In a typical application of the illustrated embodiment of the present invention, the lift arms 16 first engage a spindle projecting through the core of a cable reel. Latches 24 are inserted over each end of the spindle and engaged in the hole for receiving pin 30 in the arms. Pins 40 are then inserted through holes near the ends of spindle and secured thereto such as by springs 42. The spindle is now locked in position to each of arms 16 such that both lateral and axial movement of the spindle are restricted.

To release the spindle from the pivotting arms, pins 40 are removed from each end of the spindle. Next, each latch 24 is removed from its operative position by manually pulling the latch laterally away from arms 16. Spring loaded ball detent 32 is preferably biased to respond to a manual withdrawing force of predetermined magnitude by receding inwardly within rod 30 to permit disengagement of the latch from arm 16. Although the latch can be manually removed from the arm, the detent prevents accidental disengagement of the latch from arm 16. Since bore 28 in the body of the latch is dimensioned to provide clearance for the spindle, the latch is not subjected to an outward force due to axial movement of the spindle. Should the spindle move axially, pin 40 at the trailing end of the spindle will engage body 26 forcing it against an external surface 44 of arm 16. The latch mechanism of the present invention positively captivates the spindle within the recesses of the arms, restricts axial movement of the spindle, and prevents the spindle from rotating as cable is unwound from the reel.

Although an embodiment of the present invention has been described above and illustrated in the drawings, the scope of the present invention is defined by the claims appended hereto.

What is claimed is:

1. In a mechanism for moving structures relative to a supporting bed, the mechanism including pivotally mounted arms having recesses defined at one end of said arms, rod means carried by the structures for engagement with said recesses in the arms whereby pivoting movement of the arms operates to lift the structures, and means for locking said rod means in engagement with said recess in each arm, the improvement in said locking means comprising a latch mechanism having a plate-like body having a completely enclosed aperture therein, said aperture dimensioned to receive said rod means therethrough, and manually operable means for releasably attaching said body to said arm, to prevent translational movement of said body in a plane perpendicular to said rod means, wherein said latch when engaged with said arm and said rod means retains said rod means within the recess of said arm.

2. A construction in accordance with claim 1 wherein said attaching means includes an attaching rod mounted to said plate-like body extending generally perpendicularly thereto, said lifting arms defining an aperture dimensioned to receive said attaching rod.

3. A construction in accordance with claim 2 further comprising a means mounted at the remote end of said attaching rod for releasably retaining said attaching rod within the aperture in said arm.

4. A construction in accordance with claim 3 wherein said retaining means comprises a spring loaded ball detent biased to project radially outwardly beyond said attaching rod, said detent disposed to retract within said attaching rod to permit said attaching rod to be withdrawn from the aperture in said arm.

5. A construction in accordance with claim 1 wherein said rod means comprises a spindle.

6. A construction in accordance with claim 5 further comprising means for restricting axial movement of the spindle relative to said body.

7. A construction in accordance with claim 6 wherein said restricting means includes an abutment member mounted to said spindle and extending beyond the spindle to abut said body upon axial movement of said spindle.

8. A construction in accordance with claim 7 wherein said restricting means includes first and second abutment members mounted to said spindle adjacent each end of said spindle, respectively, so that said abutment members are disposed outside of said lifting arms.

9. A construction in accordance with claim 7 further comprising means for preventing said rod means from rotating.

10. A construction in accordance with claim 9 wherein said preventing means includes said abutment member and a handle mounted to said body, said abutment member extending beyond said rod means so as to abut said handle as the rod means attempts to rotate thereby preventing the rotation of said rod means.

11. A construction in accordance with claim 10 wherein said handle includes a first portion which extends generally perpendicular to said body and a remote portion which is generally parallel to said body, said first portion of the handle disposed to engage said abutment member.

12. A construction in accordance with claim 2 further comprising means for preventing said rod means from rotating.

13. A construction in accordance with claim 12 wherein said preventing means includes an abutment member and a handle mounted to said body, said abutment member extending beyond said rod means so as to abut said handle as the rod means attempts to rotate, thereby preventing the rotation of said rod means.

14. A construction in accordance with claim 13 wherein said handle includes a first portion which extends generally perpendicular to said body and a remote portion of the handle disposed to engage said abutment member.

* * * * *